United States Patent
Jule

(10) Patent No.: US 10,988,264 B2
(45) Date of Patent: Apr. 27, 2021

(54) LIGHTWEIGHT PRIMARY STRUCTURE FOR AIRCRAFT ENGINE MOUNTING PYLON

(71) Applicant: AIRBUS SAS, Blagnac (FR)

(72) Inventor: Pascal Jule, Tournefeuille (FR)

(73) Assignee: AIRBUS SAS

( * ) Notice: Subject to any disclaimer, the term of this patent is extended or adjusted under 35 U.S.C. 154(b) by 364 days.

(21) Appl. No.: 16/037,236

(22) Filed: Jul. 17, 2018

(65) Prior Publication Data

US 2019/0039744 A1 Feb. 7, 2019

(30) Foreign Application Priority Data

Aug. 2, 2017 (FR) ..................................... 1757443

(51) Int. Cl.
| | |
|---|---|
| *B64D 27/26* | (2006.01) |
| *B64D 27/18* | (2006.01) |
| *B64C 3/32* | (2006.01) |

(52) U.S. Cl.
CPC ................ *B64D 27/26* (2013.01); *B64C 3/32* (2013.01); *B64D 27/18* (2013.01); *B64D 2027/264* (2013.01)

(58) Field of Classification Search
CPC ........ B64D 27/26; B64D 27/18; B64D 27/12; B64D 27/06; B64D 2027/264; B64C 3/32
See application file for complete search history.

(56) References Cited

U.S. PATENT DOCUMENTS

| | | | |
|---|---|---|---|
| 8,814,079 B2 * | 8/2014 | Teulou ................... | B64D 27/26 244/54 |
| 9,889,943 B2 | 2/2018 | Ewens et al. | |
| 2015/0166192 A1 * | 6/2015 | Ewens ..................... | B64F 5/40 244/54 |
| 2015/0197341 A1 * | 7/2015 | Ewens ..................... | B64F 5/40 244/54 |
| 2017/0096229 A1 * | 4/2017 | Pautis ..................... | B64D 27/18 |
| 2017/0106990 A1 | 4/2017 | Journade et al. | |
| 2017/0152052 A1 * | 6/2017 | Ewens ................... | B64D 27/26 |
| 2018/0186463 A1 * | 7/2018 | Gallant ................. | B64D 27/26 |
| 2018/0305032 A1 * | 10/2018 | Gallant ................. | B64D 27/26 |

FOREIGN PATENT DOCUMENTS

| | | |
|---|---|---|
| EP | 2 426 051 A1 | 3/2012 |
| FR | 2 956 706 A1 | 8/2011 |
| FR | 3 014 840 A1 | 6/2015 |

* cited by examiner

*Primary Examiner* — Rodney A Bonnette
(74) *Attorney, Agent, or Firm* — Lerner, David, Littenberg, Krumholz & Mentlik, LLP

(57) ABSTRACT

In order to reduce the mass of a primary structure of a mounting pylon for an engine of an aircraft, the mounting pylon includes a box and a rear sub-structure fastened to the box which includes two lateral panels, each equipped at its rear end with a first linking portion through which passes a first connection orifice that is designed to receive a connection pin of a lateral front wing attachment. The rear sub-structure is made in one piece and includes two opposite lateral flanks that are respectively fastened to the two lateral panels of the box by fastening elements. Each lateral flank has a second linking portion through which passes a second connection orifice that is aligned with the first connection orifice, and is also designed to receive the connection pin of the lateral front wing attachment.

15 Claims, 5 Drawing Sheets

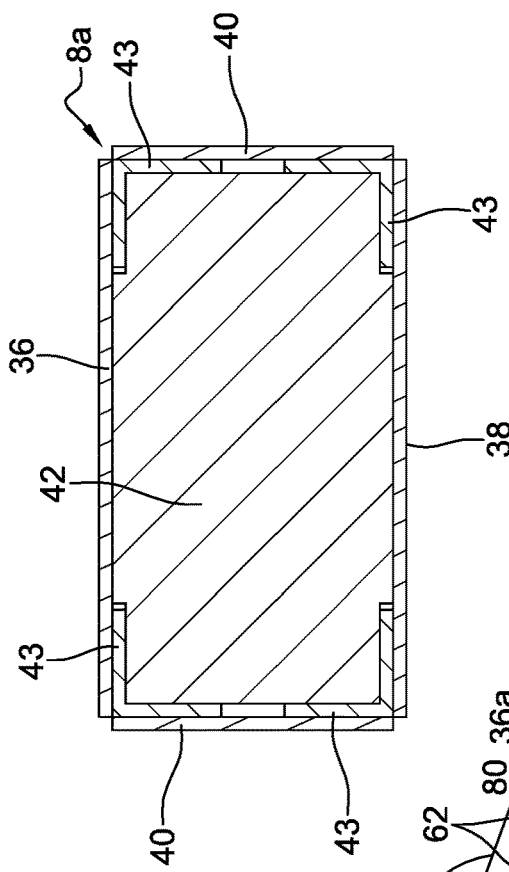
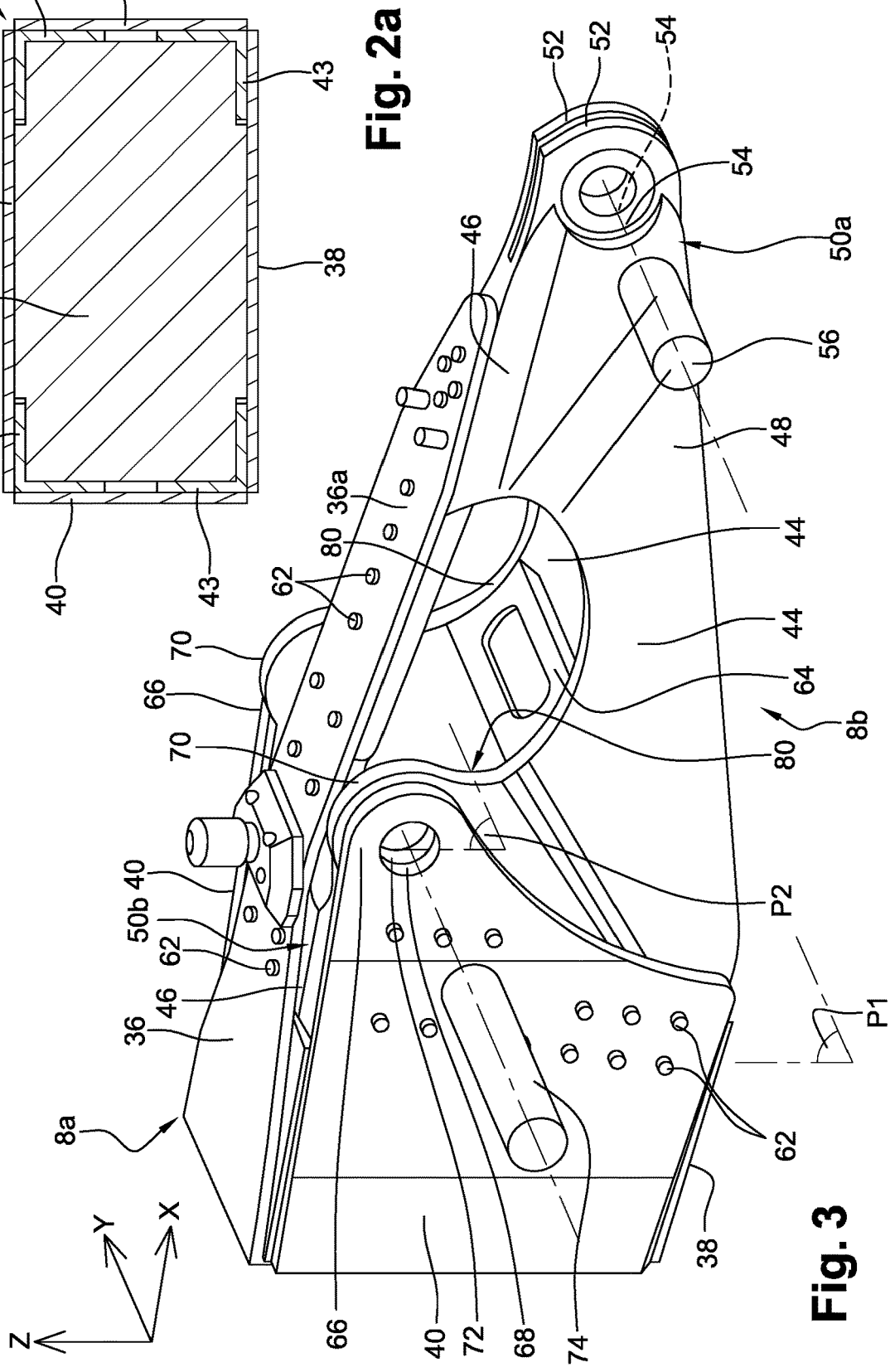
Fig. 2a
Fig. 3

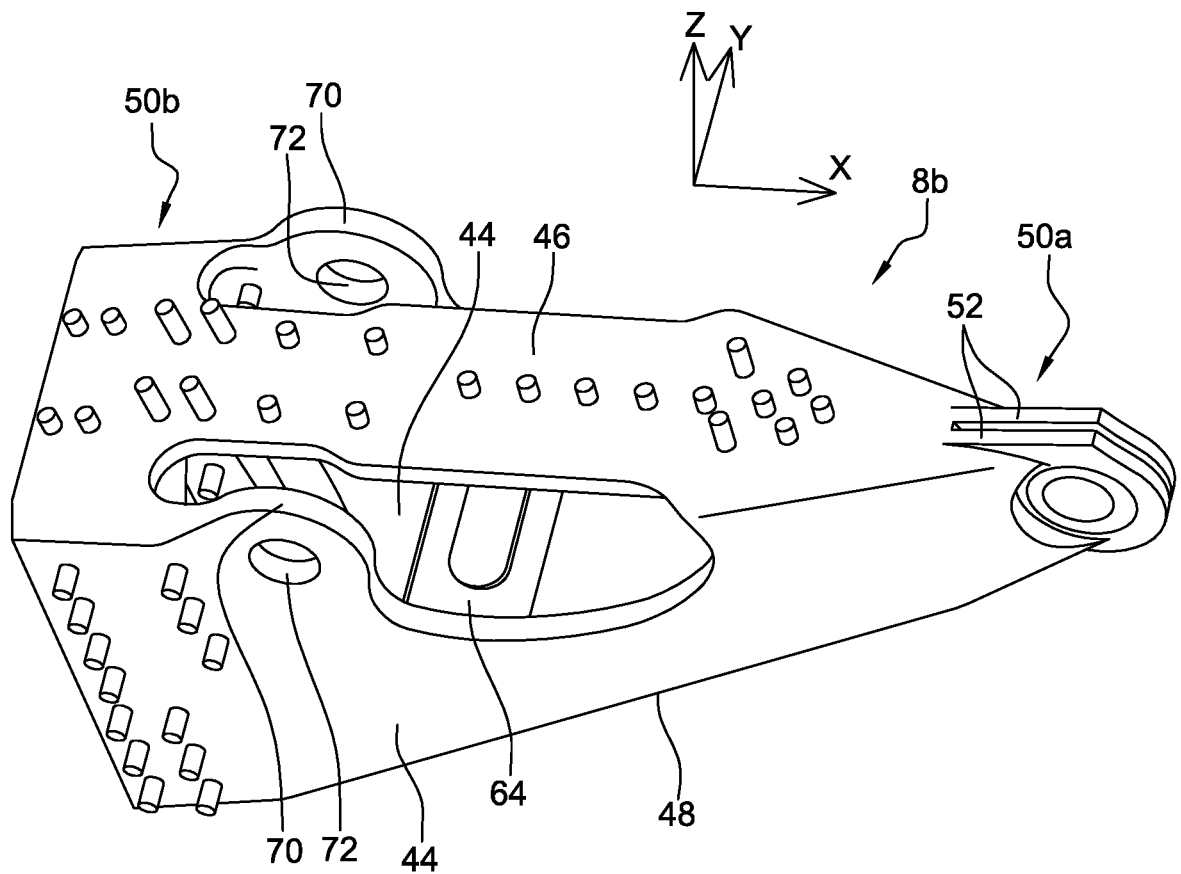
Fig. 4
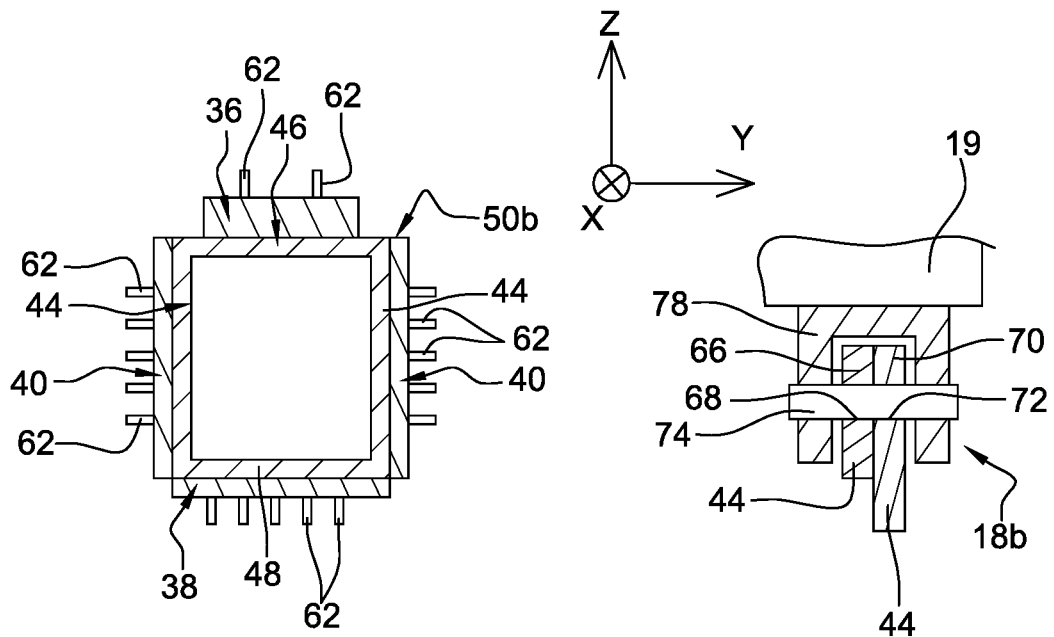
Fig. 5
Fig. 6

LIGHTWEIGHT PRIMARY STRUCTURE FOR AIRCRAFT ENGINE MOUNTING PYLON

FIELD OF THE INVENTION

The present invention relates to the field of assemblies for aircraft including an aircraft engine mounting pylon, a wing element, and means for mounting the primary structure of the pylon to the wing element.

It preferably applies to commercial aircraft.

BACKGROUND OF THE INVENTION

In existing aircraft, the engines such as dual-flow, two-spool jet engines are usually mounted below the wing using complex mounting devices, also referred to as EMS (engine mounting structure) or mounting pylon. Mounting pylons of this kind are known for example from document FR 3 014 840.

The mounting pylons that are usually used have a primary structure, which is also termed the rigid structure. This primary structure generally has at least one portion in the general shape of a box, that is to say that it is made up of by joining lower and upper spars that are linked to one another by a plurality of transverse stiffening ribs which are located inside the box. The spars are arranged at the lower and upper faces while lateral panels close the box to form lateral faces. Angle stock can provide the mechanical connection between these constituent elements of the box, the transverse section of which is in the general shape of a quadrilateral, usually square or rectangular.

As is known, the primary structure of a mounting pylon is designed to allow the static and dynamic forces produced by the engines, such as weight and thrust but also the various dynamic forces, to be transmitted to the wing.

To that end, the mounting means are arranged between the wing element and the primary structure of the pylon. These are multiple wing attachments located in the rear portion of the primary structure. In certain embodiments, this primary structure is augmented by a rear sub-structure fastened behind the box. In this specific case, the front end of the rear sub-structure is fastened by means of bolts to the rear end of the box, and this front end is accommodated between linking portions provided at the rear of the two lateral panels of the box. Each linking portion is in the form of a lug which is provided with a connection orifice that accommodates a connection pin of a lateral front wing attachment.

In order to meet "fail-safe" safety requirements, it proves necessary to provide, for each lug, a secondary force path that can react forces for a certain time following failure of one of these lateral panel lugs of the box. This redundancy is generally ensured by installing, on the pylon, a backup lug that is pressed against the principal lug and is fastened to its associated lateral panel by bolts. Thus, the lateral front wing attachment connection pin passes through both lugs such that, in the event of failure of the main lug, the backup lug ensures that forces continue to be transmitted to the wing element of the aircraft.

Although this solution proves satisfactory from a structural and safety point of view, it does however have a large overall mass which is penalized in particular by the presence of the backup lugs and their means for fastening to the lateral panels of the box. There is therefore a need to optimize the design of the primary structure of the pylon so as to reduce its overall mass.

EP 2 426 051 A1 also describes an aircraft engine mounting pylon according to the prior art.

BRIEF SUMMARY OF THE INVENTION

The invention relates first of all to a mounting pylon for an engine of an aircraft, including a primary structure comprising a box and a rear sub-structure fastened to said box, said box including two opposite lateral panels, each equipped at its rear end with a first linking portion through which passes a first connection orifice that is designed to receive a connection pin of a lateral front wing attachment.

According to an embodiment of the invention, the rear sub-structure is made in one piece including a rear end corresponding to the rear end of the primary structure, the rear sub-structure including two opposite lateral flanks that are respectively fastened to the two lateral panels of the box by means of fastening elements, each lateral flank having a second linking portion through which passes a second connection orifice that is aligned with said first connection orifice, and is also designed to receive the connection pin of the lateral front wing attachment.

Thus, an aspect of the invention is ingenious in that it makes use of the rear sub-structure to ensure the redundancy of the first linking portions provided on the lateral panels of the box. Thus, the backup lugs used in the prior art are no longer necessary, and neither are their fastening means.

The advantageous consequence of this is a mass saving for the primary structure of the mounting pylon, which saving can be as much as 200 kg per pylon.

The invention also preferably provides at least one of the following optional features, taken in isolation or in combination.

Said second linking portion is arranged adjacent to an opening created through the rear sub-structure for the purpose of carrying out maintenance operations.

Said opening is created in part in the lateral flank and in part in an upper or lower flank of the rear sub-structure, from which flank said second linking portion extends outwards.

Each of the first and second linking portions is in the form of a lug.

Said rear sub-structure has a shape that narrows in the rearward direction, and is preferably in the general shape of a cone or a pyramid.

Said rear sub-structure is made of composite material.

Said rear sub-structure comprises a front fastening end that is secured by means of said fastening elements to the two lateral panels of the box, and to an upper spar and a lower spar of this same box.

Either the upper spar or the lower spar of the box comprises a rear spar extension covering part of the rear sub-structure, and secured thereto by fastening elements.

The fastening elements are preferably bolts, or similar elements.

The pylon comprises a reinforcement element added between the two lateral flanks of the rear sub-structure.

The rear end of the sub-structure defines two rear connection orifices that are aligned and designed to receive said connection pin of the rear wing attachment.

The invention also relates to an assembly for an aircraft, including:
 an engine mounting pylon as described above;
 a wing element; and
 means for mounting the primary structure of the pylon on the wing element of the aircraft.
 Said mounting means preferably consist:
 of a central front wing attachment;

of two lateral front wing attachments;

of a rear wing attachment including a connection pin passing through at least one rear connection orifice of the rear end of the rear sub-structure, or of a bolted attachment comprising bolts passing through an upper flank of the sub-structure.

Depending on the nature of the third attachment, the system for reacting forces is statically determinate or statically indeterminate.

Finally, the invention relates to an aircraft comprising at least one such assembly.

Other advantages and characteristics of the invention will become apparent from the following non-limiting detailed description.

BRIEF DESCRIPTION OF THE DRAWINGS

This description will be provided with reference to the appended drawings, in which:

FIG. 2a is a view in section considered along line IIa-IIa of FIG. 2;

FIG. 3 represents a view in perspective of a portion of the primary structure of the mounting pylon shown in FIGS. 2 and 2a;

FIG. 4 is a view in perspective of the rear sub-structure of the primary structure shown in the preceding figure;

FIGS. 5 and 6 are views in cross section of the primary structure of the mounting pylon, considered respectively according to planes P1 and P2 of FIG. 3;

DETAILED DESCRIPTION

Figure 1:
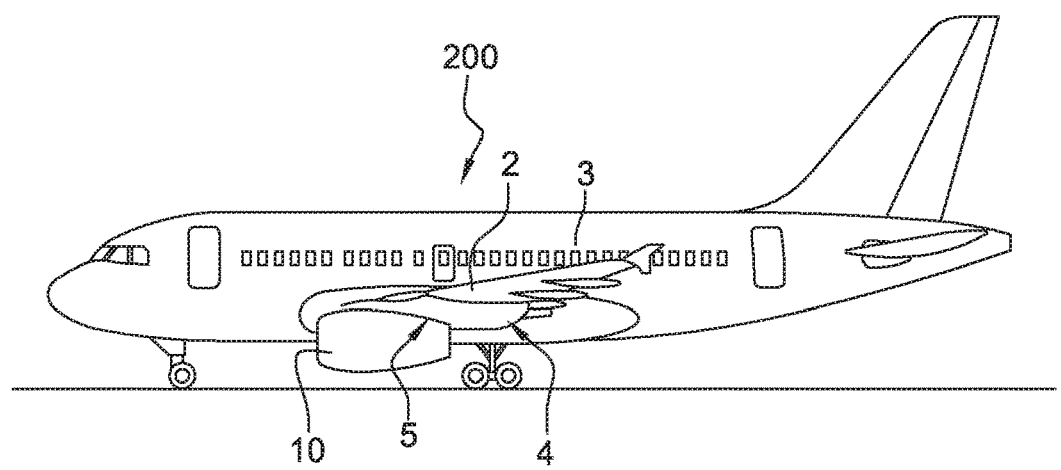
FIG. 1 shows a side view of an aircraft according to the invention.

FIG. 1 shows an aircraft 200 comprising a fuselage 3 to which two wings 2 are fastened (FIG. 1 shows only one). These wings 2 are an integral part of several assemblies 5 which are specific to the invention and which will be set out hereinbelow. Each assembly 5 comprises, in general, a wing element, in this case a wing 2 or a wing section 2, an engine mounting pylon 4 and means for mounting the pylon on the wing. The assembly 5 is intended to bear an engine 10, preferably a dual-flow, two-spool engine such as a jet engine.

Conventionally, the engine 10 is slung below the wing 2. Nonetheless, the invention covers other solutions in which the engine is located above the wing, or even borne by another wing element such as a vertical or horizontal empennage, or a rudder.

In all of the following description, by convention, the X direction corresponds to the longitudinal direction of the pylon 4, which can also be considered to be similar to the longitudinal direction of the jet engine 10 and that of the assembly 5, this X direction being parallel to a longitudinal axis 9 of this jet engine 10. Also, the Y direction corresponds to the direction oriented transversely relative to the pylon 4 and can also be considered to be similar to the transverse direction of the jet engine and that of the assembly 5, and the Z direction corresponds to the vertical direction or the height, these three directions X, Y and Z being orthogonal to one another.

Figure 2:
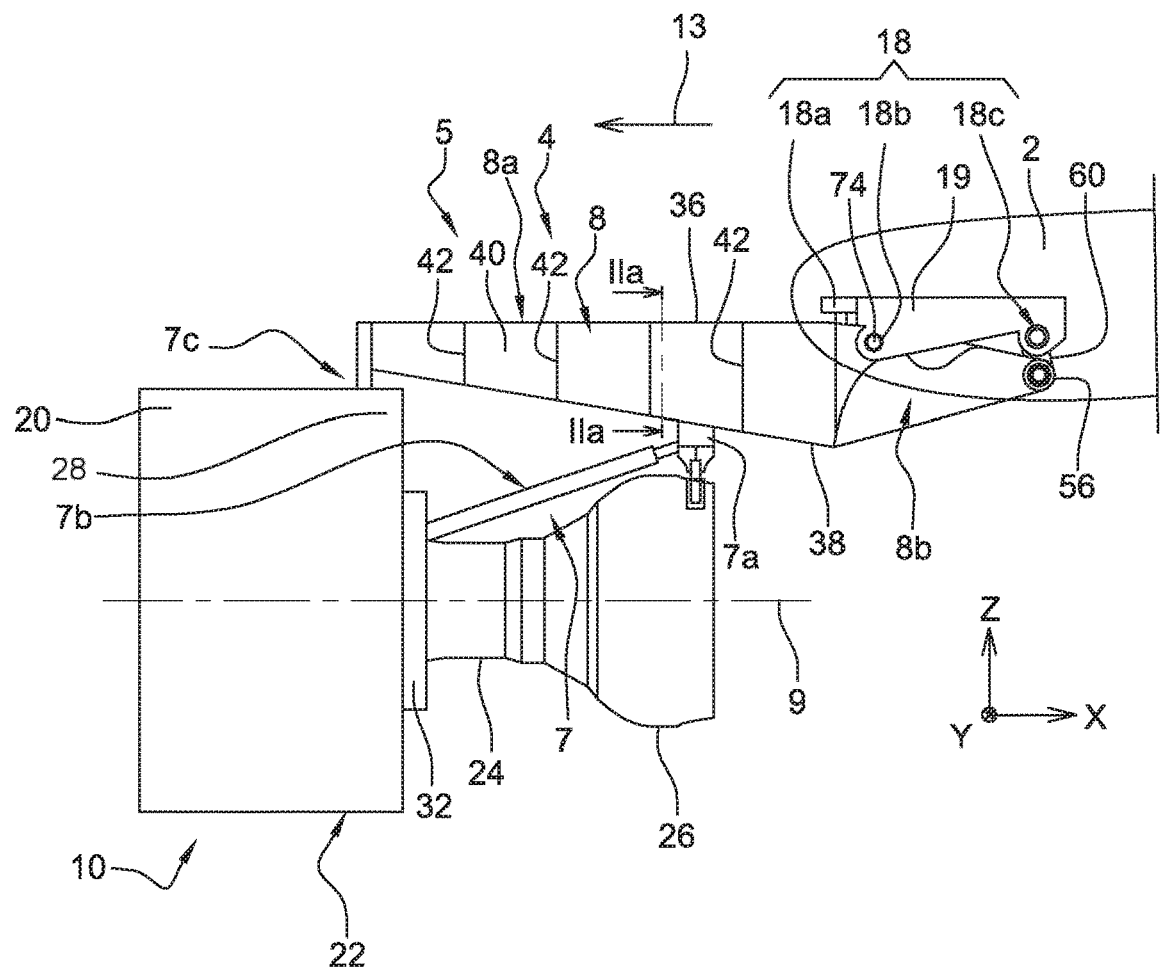
FIG. 2 is a schematic view in longitudinal section of an assembly for aircraft according to the invention.

Moreover, the terms "front" and "rear" are to be considered in relation to a direction of advance of the aircraft that takes place as a consequence of the thrust produced by the jet engines 10, this direction being represented schematically by the arrow 13 in FIG. 2. With reference to that figure, the jet engine 10 comprises a structural external envelope formed of various casings. These are, from front to rear, a fan casing 20, an intermediate casing 22, a central casing 24 and a gas exhaust casing 26. The intermediate casing 22 comprises an outer hoop 28 that is located in the rear continuation of the fan casing, with essentially the same diameter. This hoop 28 bears, internally, radial structural arms (not shown, also referred to as structural OGVs) which are connected, at their internal end, to a hub 32 of the intermediate casing 22.

FIG. 2 shows only the primary structure 8 of the pylon, and not the secondary structures that are designed to be added to this primary structure 8. The secondary structures are conventional and will not be set out hereinbelow. They separate and hold the systems while supporting aerodynamic cowling elements.

The primary structure 8 is specific to the present invention and will be set out in detail hereinbelow. It comprises a portion 8a in the form of a box, which constitutes the majority of the primary structure. This is augmented by a rear sub-structure 8b that has a shape that narrows in the rearward direction. In that regard, it is noted that the rear sub-structure 8b is preferably in the general shape of a cone or a pyramid.

The box 8a, which thus extends from the front end of the primary structure to the front end of the rear sub-structure 8b, is formed of an upper spar 36 and a lower spar 38, and two opposite lateral panels 40 (of which only one is shown in FIG. 2). These box elements are connected to one another by means of internal transverse stiffening ribs 42, which are usually oriented along parallel YZ planes. These ribs are distributed within the box, along the X direction. With reference to FIG. 2, it is noted that angle stock 43 can also be arranged between the elements 36, 38, 40, such that they can be fastened to one another. Alternatively, it is also possible to provide a more "integrated" design for the box, in which a single part can form all or some of several of these elements 36, 38, 40.

The engine 10 is mounted, below the wing, to the box 8a by means of the mounting means 7 that preferably consist of a front engine attachment 7c, a rear engine attachment 7a and a device for reacting the thrust forces, formed of two lateral rods 7b for reacting the thrust forces. The rear engine attachment 7a connects the exhaust casing 26 to the lower spar 38 of the box. The front engine attachment 7c connects the front end of the box to the fan casing 20, or to the intermediate casing 22, located in the rear continuation thereof. In this last solution, the front engine attachment 7c is more preferably connected to the outer hoop 28 of this intermediate casing 22. Preferably, the mounting means 7 form a statically determinate system for reacting forces.

Moreover, the primary structure 8 is connected to the wing 2 by mounting means 18, in this case in the form of a central front wing attachment 18a, two lateral front wing attachments 18b (of which only one is shown in FIG. 2), and a rear wing attachment 18c. These wing attachments, which will be described in detail later on, are housed entirely or partially in the wing, and engage with one or more fittings 19 that are secured to a wing box.

These wing attachments 18a, 18b, 18c are located at the rear side of the primary structure 8, essentially at the level of the rear sub-structure 8b. The latter is specific to the invention, and will now be described with reference to all of FIGS. 2 to 6.

The rear sub-structure 8b is made of a single piece of composite material, preferably with an organic matrix. For example, it can be a composite material of the type comprising glass fibres and/or carbon fibres and a thermosetting or thermoplastic matrix. This sub-structure 8b, in the general shape of a cone or a pyramid, has two opposite lateral flanks 44, an upper flank 46 and a lower flank 48. The sub-structure 8b forms the rear portion of the primary structure, and therefore its rear end 50a corresponds to the rear end of this primary structure of the pylon.

At its rear end 50a, the sub-structure 8b has two linking portions 52 which are superposed in the Y direction, a rear connection orifice 54 passing through each one. The two orifices 54, aligned in the Y direction, receive a connection pin 56 belonging to the rear wing attachment 18c. As shown schematically in FIG. 2, the rear connection pin 56 cooperates with one or more shackles 60 of the attachment 18c, these shackles being also articulated to the fitting 19 accommodated in the wing 2.

The front end 50b of the sub-structure 8b constitutes a portion for fastening on the box 8a, and is inserted between the two lateral panels 40 which extend rearwards beyond the box portion. In cross section as shown in FIG. 5, this front fastening end 50b of the sub-structure 8b is in the shape of a quadrilateral, preferably a rectangle or a square. As shown schematically, in particular in FIG. 5, the fastening elements 62 are used to link, in pairs, the constituent elements of the front end 50b of the sub-structure 8b, and the rear end of the box. These elements are bolts 62 or similar elements. More precisely, the bolts 62 pass through and link a rear portion of each lateral panel 40 with one of the lateral flanks 44 of the sub-structure 8b. Other bolts 62 pass through and link the upper flank 46 and the upper spar 36, while yet other bolts 62 pass through the lower flank 48 and the lower spar 38. In that regard, it is also noted that the upper spar 36 of the box 8a may comprise a rear extension 36a that covers and is pressed against the upper flank 46 of the sub-structure 8b. Here, too, bolts 62 serve to fasten the extension 36a, which extends into a region close to the linking portions 52.

This securing of the rear extension 36a of the upper spar 36 on the upper flank 46 improves the mechanical strength of the sub-structure 8b, of which the two lateral flanks 44 can be connected by a reinforcing element 64. This latter part, preferably made of a metallic material and arranged between the upper flank 46 and the lower flank 48, also helps to improve the mechanical strength of the sub-structure 8b.

To the rear of the portion of each lateral box panel 40, the latter has a first linking portion 66 in the form of a lug, through which passes a first connection orifice 68 oriented in the Y direction. Moreover, close to the front end 50b, each lateral flank 44 comprises a second linking portion 70 which is also in the form of the lug and through which passes a second connection orifice 72 that is aligned with the first orifice 68. These two portions 66, 70 are pressed against one another in the Y direction, and a single connection pin 74 of the associated lateral front wing attachment 18b passes through their respective orifices 68, 72. As shown in FIG. 6, this connection pin 74 also passes through a clevis 78 that is secured to the fitting 19 accommodated in the wing, so as to form this attachment 18b.

In this preferred embodiment, the two lugs 66, 70 are provided linked to one another by the bolts 62 located more towards the front, and serving to fasten the lateral spar 40 and the lateral flank 44. The result of this is a join of the single shear type, but other solutions are possible without departing from the scope of the invention. In particular, a join of the double sheer type is conceivable, by replacing for example each second linking portion 70 with a clevis accommodating the first linking portion 66.

In order to ensure accessibility for operators to the interior of the primary structure, openings 80 are provided in the rear sub-structure 8b. Each opening 80 is large enough, for example, for the arm of an operator to reach in for the purpose of carrying out maintenance operations from inside the sub-structure 8b. There are preferably two openings 80, each one adjacent to one of the second linking portions 70. More precisely, each opening 80 extends from the portion 70, on one hand rearwards through the associated lateral flank 44, and on the other hand in the Y direction through the upper flank 46. Between the two openings 80, the remaining portion of this upper flank 46 is that which receives the rear extension 36a of the upper box spar.

The openings 80 also facilitate the accessibility to the connection orifices 68, 72 for the installation of the connection pins 74, this ease being increased by the fact that each second linking portion 70 extends outward and upward from the upper flank 46 of the sub-structure 8b.

By virtue of this arrangement, each lateral front wing attachment 18b has the required redundancy at the level of the lugs 60, 70. Thus, in the event of one of these failing, the other remains able to react the forces from the box and to transmit these to the wing 2. The proposed design is therefore "fail-safe" in nature, which is achieved in an ingenious manner by using the rear sub-structure 8b.

Figure 7:
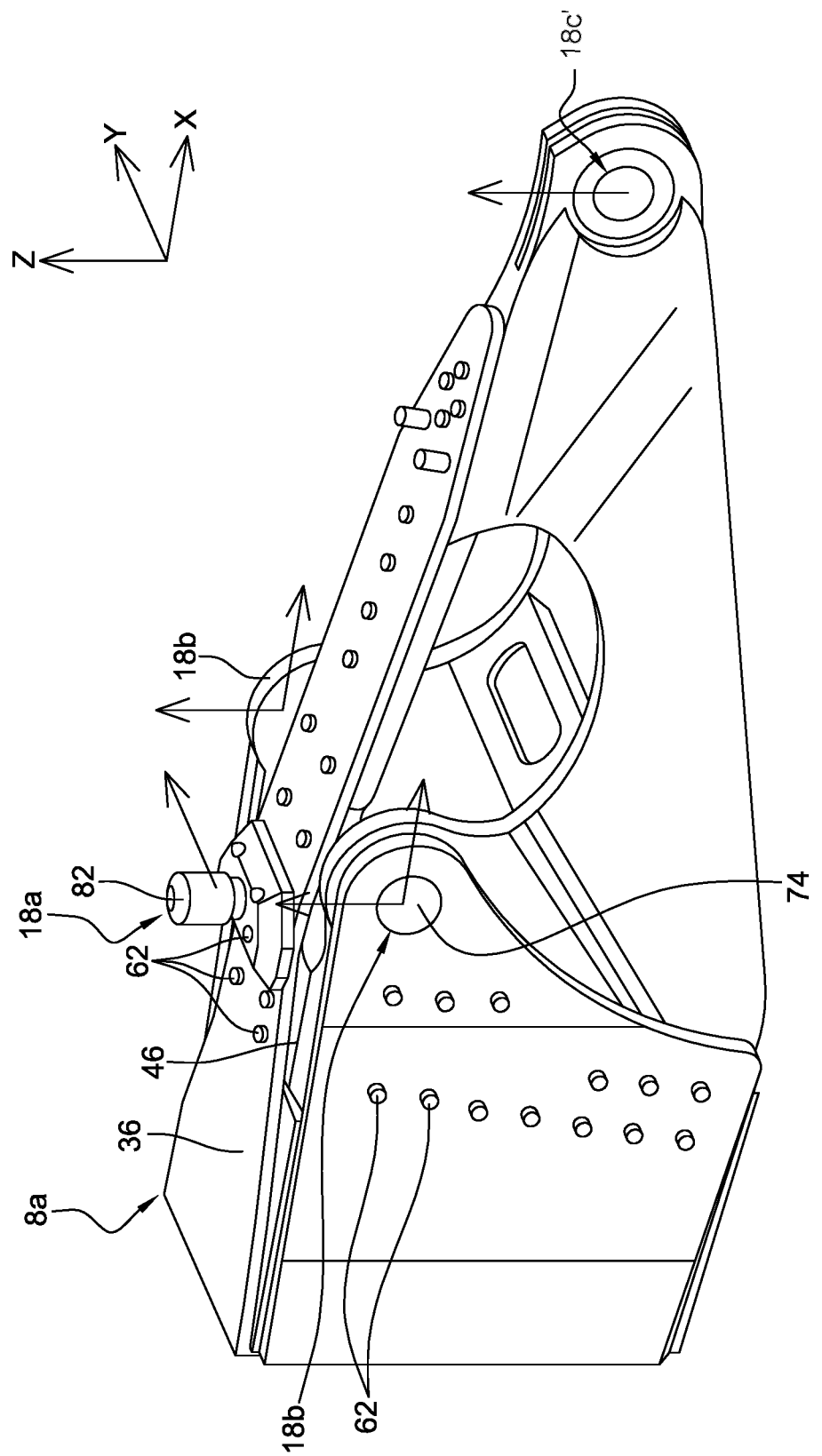
FIG. 7 is a view in perspective similar to that of FIG. 3, showing schematically the reaction of forces provided by the attachments of the wing.

FIG. 7 schematically represents the reaction of the forces by each of the four wing attachments, which together form a statically determinate system for reacting forces.

The central front wing attachment 18a is in the form of a shear pin 82 oriented in the Z direction, and reacts forces only in the Y direction. The pin 82 is secured to a fitting that is fastened by the bolts 62 at a region of overlap between the upper flank 46 and the upper box spar 36. Slightly to the rear are the two lateral front wing attachments 18b, which each react forces in the X direction and in the Z direction. Finally, the rear wing attachment 18c reacts only those forces acting in the Z direction.

Figure 8:
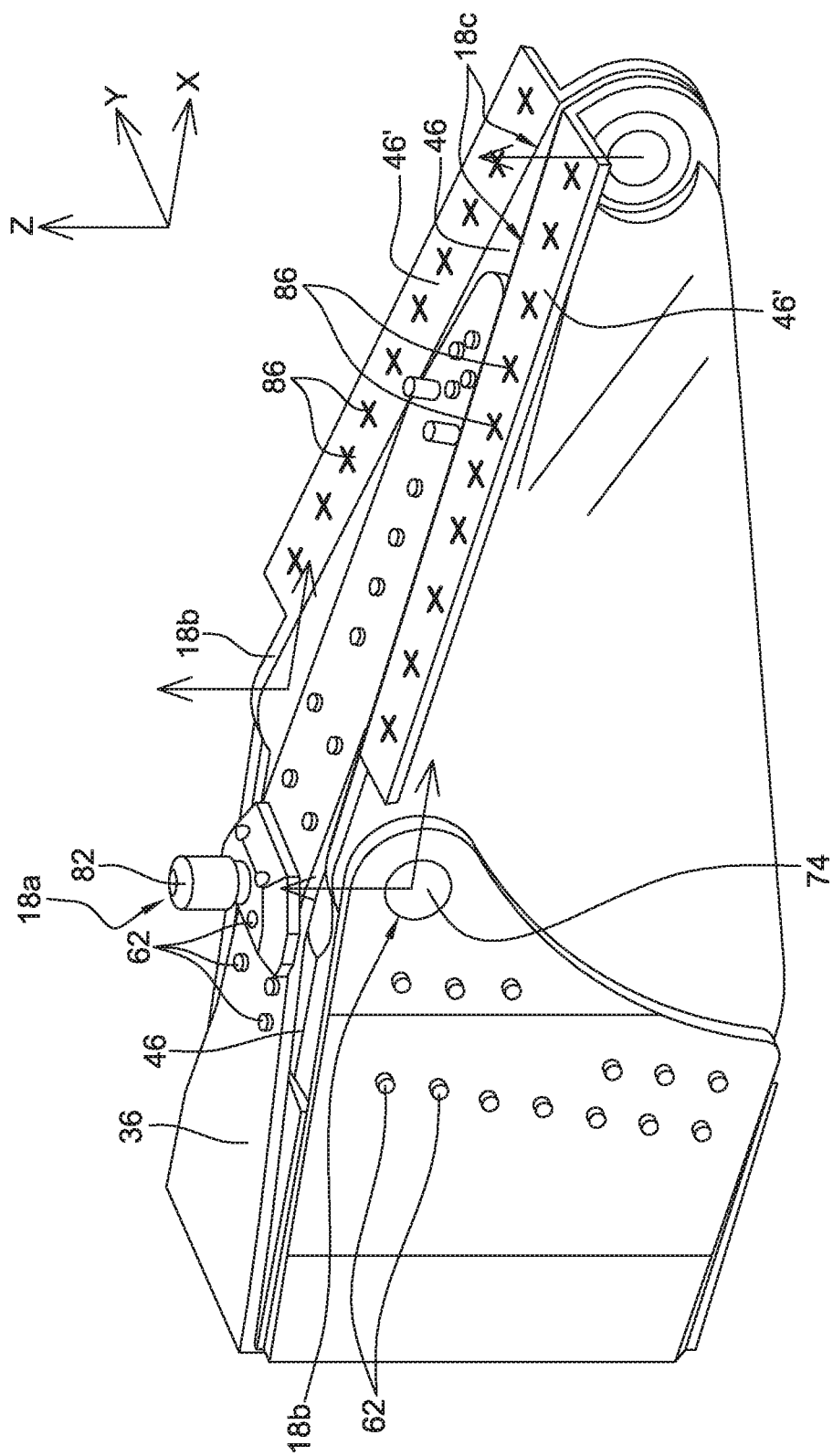
FIG. 8 is a view similar to that of FIG. 7, for an alternative embodiment.

FIG. 8 shows an alternative embodiment in which the rear wing attachment is replaced with a bolted attachment 18c', making the reacting system statically indeterminate. This bolted attachment 18c' therefore comprises bolts 86 that pass through the wing element (not shown in FIG. 8) and the rear sub-structure 8b. Preferably, the bolts 86 pass through the upper flank 46 of the rear sub-structure, and more specifically two upper shoulders 46' of the lateral flanks 44, which therefore help to define this upper flank. To that end, the upper shoulders 46' are preferably bent at 90° to their respective lateral flanks 44.

The bolts 86 are distributed in the X direction over a large portion of the rear sub-structure 8b or even over all of the latter. Finally, it is noted that, in this alternative embodiment, the openings 80 can be omitted in order to improve the mechanical strength of the rear sub-structure 8b.

It will be appreciated that various modifications can be made by persons skilled in the art to the invention which has just been described, purely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mounting pylon for an engine of an aircraft, the mounting pylon comprising:
    a primary structure comprising a box and a rear sub-structure fastened to said box, said box including two opposite lateral panels, each equipped at its rear end with a first linking portion through which passes a first connection orifice configured to receive a connection pin of a lateral front wing attachment,
    wherein the rear sub-structure is made in one piece including a rear end corresponding to the rear end of the primary structure, the rear sub-structure including two opposite lateral flanks that are respectively fastened to the two lateral panels of the box by fastening elements, each lateral flank having a second linking portion through which passes a second connection orifice aligned with said first connection orifice, and configured to receive the connection pin of the lateral front wing attachment.

2. The mounting pylon according to claim 1, wherein said second linking portion is arranged adjacent to an opening created through the rear sub-structure for the purpose of carrying out maintenance operations.

3. The mounting pylon according to claim 2, wherein said opening is created in part in the lateral flank and in part in an upper or lower flank of the rear sub-structure, from which lateral flank said second linking portion extends outwards.

4. The mounting pylon according to claim 1, wherein each of the first and second linking portions is in the form of a lug.

5. The mounting pylon according to claim 1, wherein said rear sub-structure has a shape that narrows in the rearward direction, and is in the general shape of a cone or a pyramid.

6. The mounting pylon according to claim 1, wherein said rear sub-structure is made of composite material.

7. The mounting pylon according to claim 1, wherein said rear sub-structure comprises a front fastening end secured by said fastening elements to the two lateral panels of the box, and to an upper spar and a lower spar of the box.

8. The mounting pylon according to claim 7, wherein either the upper spar or the lower spar of the box comprises a rear spar extension covering part of the rear sub-structure, and secured thereto by fastening elements.

9. The mounting pylon according to claim 1, wherein the fastening elements are bolts.

10. The mounting pylon according to claim 1, further comprising a reinforcement element added between the two lateral flanks of the rear sub-structure.

11. The mounting pylon according to claim 1, wherein the rear end of the rear sub-structure defines two rear connection orifices aligned and configured to receive said connection pin of the rear wing attachment.

12. An assembly for an aircraft, including:
    an engine mounting pylon according to claim 1;
    a wing element; and
    means for mounting the primary structure of the pylon on the wing element of the aircraft.

13. The assembly according to claim 12, wherein said mounting means comprises:
    a central front wing attachment;
    two lateral front wing attachments; and
    a rear wing attachment including a connection pin passing through at least one rear connection orifice of the rear end of the rear sub-structure, or of a bolted attachment comprising bolts passing through an upper flank of the sub-structure.

14. The assembly according to claim 12, wherein said mounting means form a statically determinate or statically indeterminate system for reacting forces.

15. An aircraft comprising at least one assembly according to claim 14.

* * * * *